United States Patent [19]

Radomilovich

[11] Patent Number: 4,677,579
[45] Date of Patent: Jun. 30, 1987

[54] SUSPENDED LOAD MEASUREMENT SYSTEM

[75] Inventor: Donald Radomilovich, Greendale, Wis.

[73] Assignee: Becor Western Inc., South Milwaukee, Wis.

[21] Appl. No.: 780,016

[22] Filed: Sep. 25, 1985

[51] Int. Cl.⁴ .................. G01G 19/14; G01L 5/00
[52] U.S. Cl. .................. 364/567; 73/862.56; 177/147
[58] Field of Search ......... 177/147, 185; 364/463, 364/508, 567; 73/862.56

[56] References Cited

U.S. PATENT DOCUMENTS

4,500,969 2/1985 Hasselmann et al. ............ 364/508
4,553,618 11/1985 Kusmenskji et al. ............ 177/185

Primary Examiner—George H. Miller, Jr.
Attorney, Agent, or Firm—Quarles & Brady

[57] ABSTRACT

A power shovel for surface mining operations is equipped with a Suspended Load Measuring (SLM) system. The SLM system determines the net weight of the material in the shovel bucket by sensing the electrical parameters of the drive motors. A microprocessor inputs the drive motor electrical parameters and processes them according to the known geometry of the power shovel. To meet the requisite accuracy of ±2% for a load measuring system to be effective, the SLM system utilizes a dynamic model which accounts for both conservative and nonconservative dynamic effects prevalent in power shovel operation. Correction are included for the conservative effects of the rotational inertia of the drive motors and reduction gear train, the stretch of the cables, and the inertia of the bucket. Nonconservative losses due to friction, gear loss and motor inefficiency are also compensated for. During truck loading operations, the SLM system maintains a cumulative total of the net weight of material in the truck based on the individual weights of each shovel bucket load. The total weight in the truck is then displayed to the power shovel operator so that the truck can be accurately loaded to full capacity.

12 Claims, 8 Drawing Figures

SUSPENDED LOAD MEASUREMENT SYSTEM

BACKGROUND OF THE INVENTION

The field of the invention is heavy equipment for surface mine field loading operations such as power shovels, drag lines, and the like, and more particularly to systems used on such equipment to measure the net weight of material in each load.

In large scale surface mining operations, equipment of immense proportions is used to load and transport material. Loading is usually performed by power shovels with a bucket capacity of about 40 tons per scoop. Equally mammouth trucks are loaded with the material and haul it to a processing location. The largest trucks have a capacity of about 235 tons.

Overloading the trucks can lead to premature fatigue and failure causing excessive maintenance costs. Without a measurement of the actual weight of material in the truck, the power shovel operator can only guess the weight based on an extremely rough estimate of the volume of material in the truck. Therefore, to prevent chronic overloading, the trucks are routinely underloaded. But such underloading can cause significant loss of production.

Measurement systems have been developed to indicate the net weight of material in the power shovel bucket as it is transferred to the truck. Due to the massive size of the equipment involved, it is not practical to instrument the power shovel with strain gauges and the like. Rather, prior measurement systems function by first sensing the electrical load of the power shovel drive motors, then computing the motor torque based on that electrical load, and finally computing an estimate of the net weight based on the motor torque, the known power shovel geometry, and the known tare weights.

Although such measurement systems have been constructed and used, they have been ineffective due to large inaccuracies in the measurements on the order of ±20% or more. These errors stem from the fact that the existing measurement systems do not account for the complex dynamic operation of such enormous equipment. Therefore, measurements are not only in error, but are erratic and unpredictable. In order to be effective, a measurement system would have to be capable of accurately and repeatedly performing measurements to within a small error, ±2% for example. Otherwise, the problems of overloading and underloading would persist. Existing systems have neither approached the needed accuracy nor repeatability.

It is an advantage of the present invention to provide an improved system for measuring the load weight of large mining and lifting machinery.

It is another advantage of this invention to provide a measuring system of the foregoing type which effects calculations of load weights while in a dynamic state.

It is still another advantage of this invention to provide a measuring system of the foregoing type which can determine such calculations in a dynamic state and with an accuracy of within ±2%.

It is yet another advantage of the present invention to provide a measuring system of the foregoing type which is adaptable for use with a wide variety of mining and lifting machinery.

It is still another advantage of this invention to provide a measuring system of the foregoing type wherein the need to recalibrate sensing devices which might otherwise be used.

SUMMARY OF THE INVENTION

The foregoing advantages are accomplished by the suspended load measurement system of this invention which is capable of determining the load weight moved vertically by large mining and hoisting machinery such as excavators and cranes. This type of machinery will have the usual electric drive motors, mechanical drive means and cables attached to a load support which in the instance of a mining shovel or dragline will be a bucket and in the instance of a crane will be a hoist hook. The machinery has the usual electric drive motors, mechanical drive means and cables attached to the load support for moving the load weight. The suspended load measuring system includes means to determine the position of the load support which is referred to herein as the shovel geometry functions. Means are also provided to determine the linear accelerations of the vertical and lateral movement of the load support. Means are also employed to determine the force required to effect the vertical and lateral movement of the load means.

In one preferred embodiment, the means to determine the linear acceleration of the vertical movement of the load support includes means to determine the speed of the electric drive motors and the cable acceleration. Also in a preferred manner the means to determine the force required to effect the vertical and lateral movement includes means to determine the torques and speeds of the electric drive motors.

In yet another embodiment, the industrial machinery is a power shovel and the electric drive motors power the hoist and crowd functions.

In yet another preferred embodiment, means are provided to correct for conservative losses of rotational inertia of the motors, gear train reductions, and stretch of cables and bucket inertia. Means are also provided to correct for non-conservative losses due to friction, gear loss and motor inefficiency.

In still another embodiment, means are afforded in conjunction with the means to determine the acceleration and force of the load support and the approximate swing motor speed to determine the operating mode of a mining shovel.

The suspended load measurement system of this invention differs from the prior load measuring systems in utilizing dynamic model means to provide compensated forces and linear accelerations of the mechanical drive means. Means are provided to continuously locate the load support by shovel geometry functions. Both of the foregoing means are utilized in conjunction with means to determine the electrical parameters of the electric motors such as the current and voltage. The dynamic model means includes hoist and crowd modeling functions to result in compensated forces and acceleration determinations. Also considered are the hoist and crowd cable lengths in conjunction with the shovel geometry functions. From the compensated forces and acceleration the total weight is determined by the dynamic calculation of dividing the vertical component of the compensated force by the vertical component of the acceleration to yield a corrected total weight from which the hardware weight is subtracted to determine the net weight of material in the bucket.

DESCRIPTION OF THE PREFERRED EMBODIMENT

Figure 1:
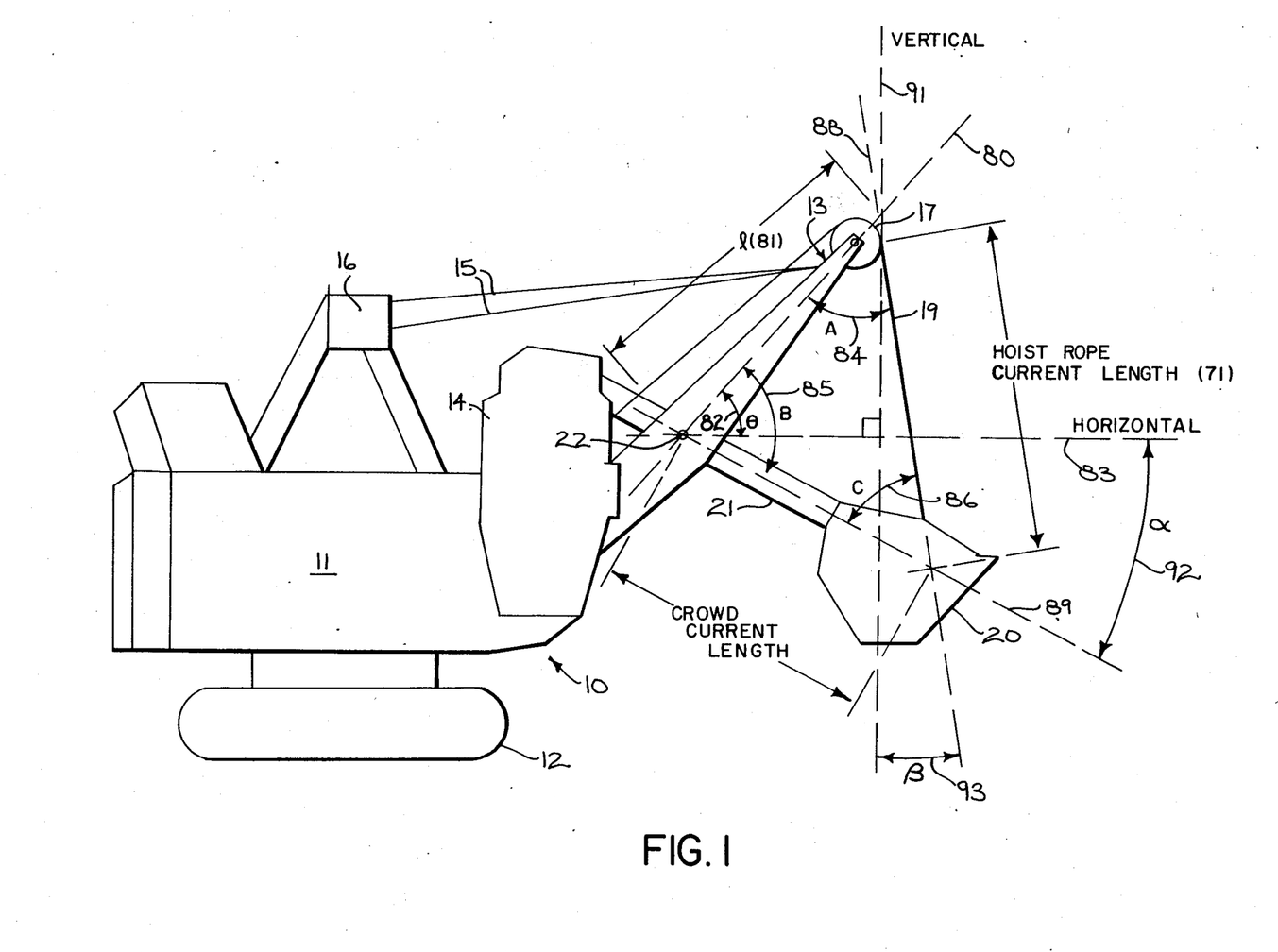
FIG. 1 is a plan view of a surface mining shovel which employs the load measurement system of the present invention.

Referring to FIG. 1, a power shovel 10 for surface mining operations includes a machinery house 11 mounted atop a caterpillar type propel transfer mechanism 12 such that the machinery house 11 is free to swing. A main boom 13 extends from the cab 14 at a fixed angle and is supported by boom cables 15 to an overhead structure 16. A pulley 17 on the end of the main boom 13 supports a large steel hoist rope 19. From the hoist rope 19, a bucket 20 is suspended. On the side of the bucket 20 facing the machinery house 11, a crowd arm 21 is rigidly attached. The crowd arm 21 is a rigid steel tube which slides in and out through a yoke (not shown) in the main boom 13. The yoke (not shown) is free to pivot about a crowd arm pivot point 22 on the main boom 13 as the bucket 20 is raised and lowered. The in and out sliding motion of the crowd arm 21 is actuated by cables (not shown) through a series of pulleys (not shown) in well known fashion such that the crowd arm 21 can be forcibly moved in either the inward or outward direction in a push-pull manner.

Figure 2:
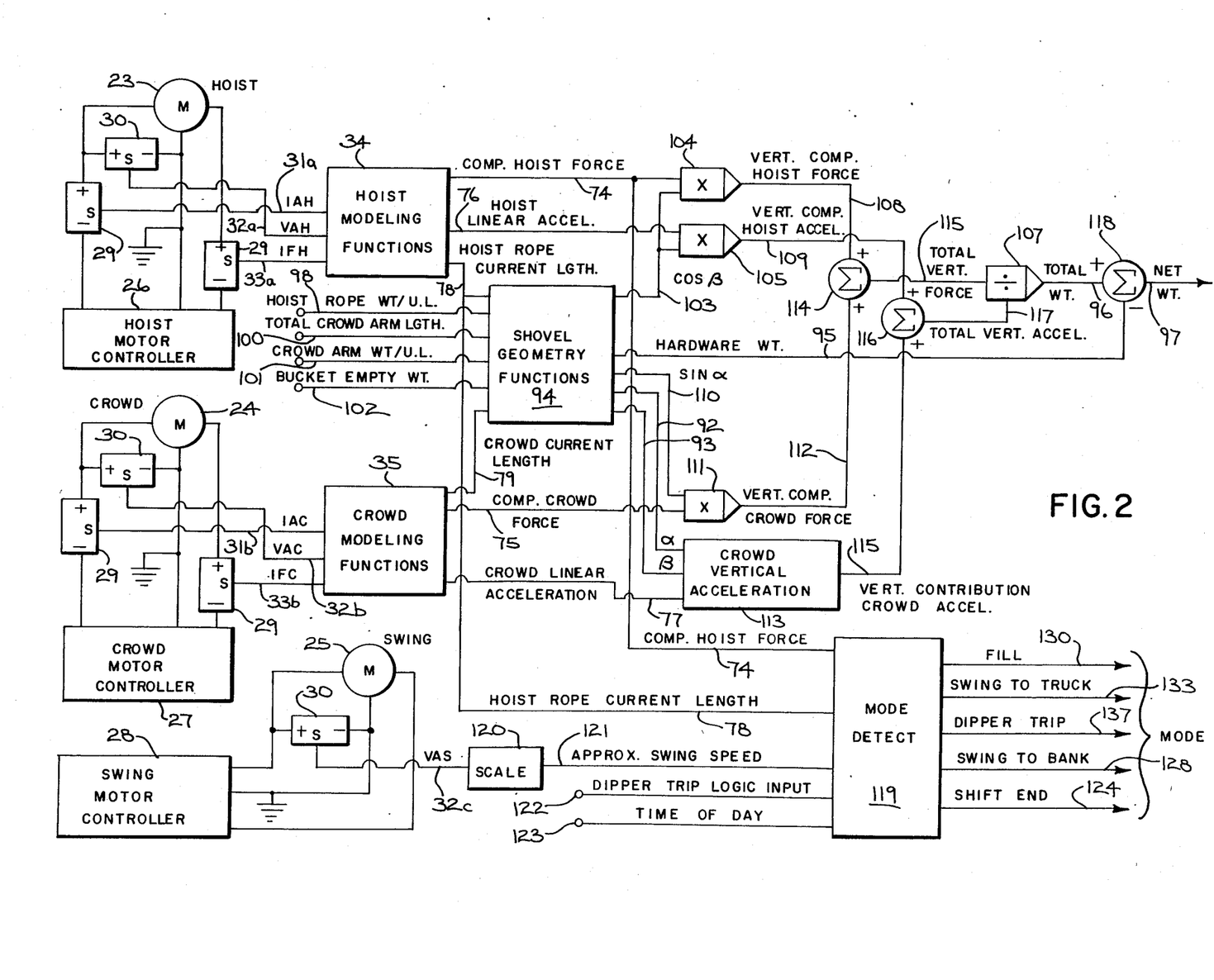
FIG. 2 is a function block diagram of the load measurement system of FIG. 1.

Referring now to FIG. 2, the hoist, crowd, and cab swing motions are each driven by a large Direct Current (D.C.) electric motor 23, 24, and 25 respectively. The hoist and crowd motors 23 and 24 each drive their respective motions through a reduction gear transmission (not shown) and a cable drum (not shown) in well known fashion. The swing motor 25 drives the swing motion directly through well known drive principles. Each motor 23, 24, and 25 is driven by a motor controller 26, 27, and 28 respectively which responds to operator commands to generate the required voltages and currents in well known fashion.

Referring to FIGS. 1 and 2, the Suspended Load Measurement (SLM) system of the present invention calculates the net weight of material in the bucket 20 by monitoring the electrical operation of drive motors 23, 24, and 25 for hoist, crowd, and swing respectively. The inaccuracies of prior systems is overcome in the SLM system of the present invention through the use of correction factors for conservative and non-conservative losses and through the use of a dynamic calculation of the material weight.

Referring again to FIG. 2, Current Sensors 29 and voltage sensors 30 of well known design are used to detect the electrical operating parameters of drive motors 23, 24, and 25. On the hoist motor 23 the armature current (IAH) 31a, armature voltage (VAH) 32a, and field current (IFH) 33a are sensed and the sensor 31a, 32a, and 33a outputs are connected to the hoist modeling functions 34. Similarly, the crowd motor 24 is sensed for armature current (IAC) 31b, armature voltage (VAC) 32b, and field current (IFC) 33b, with the sensor 31b, 32b, and 33b outputs being connected to the crowd modeling functions 35. The swing motor 25 is sensed only for armature voltage (VAS) 32c. The hoist and crowd modeling functions 34 and 35 are functionally identical and vary only in the various constants used for different motor parameters and different gear ratios. Because of the similarity between the hoist and crowd modeling functions 34 and 35, respectively, the description below is applicable to both.

Figure 3:
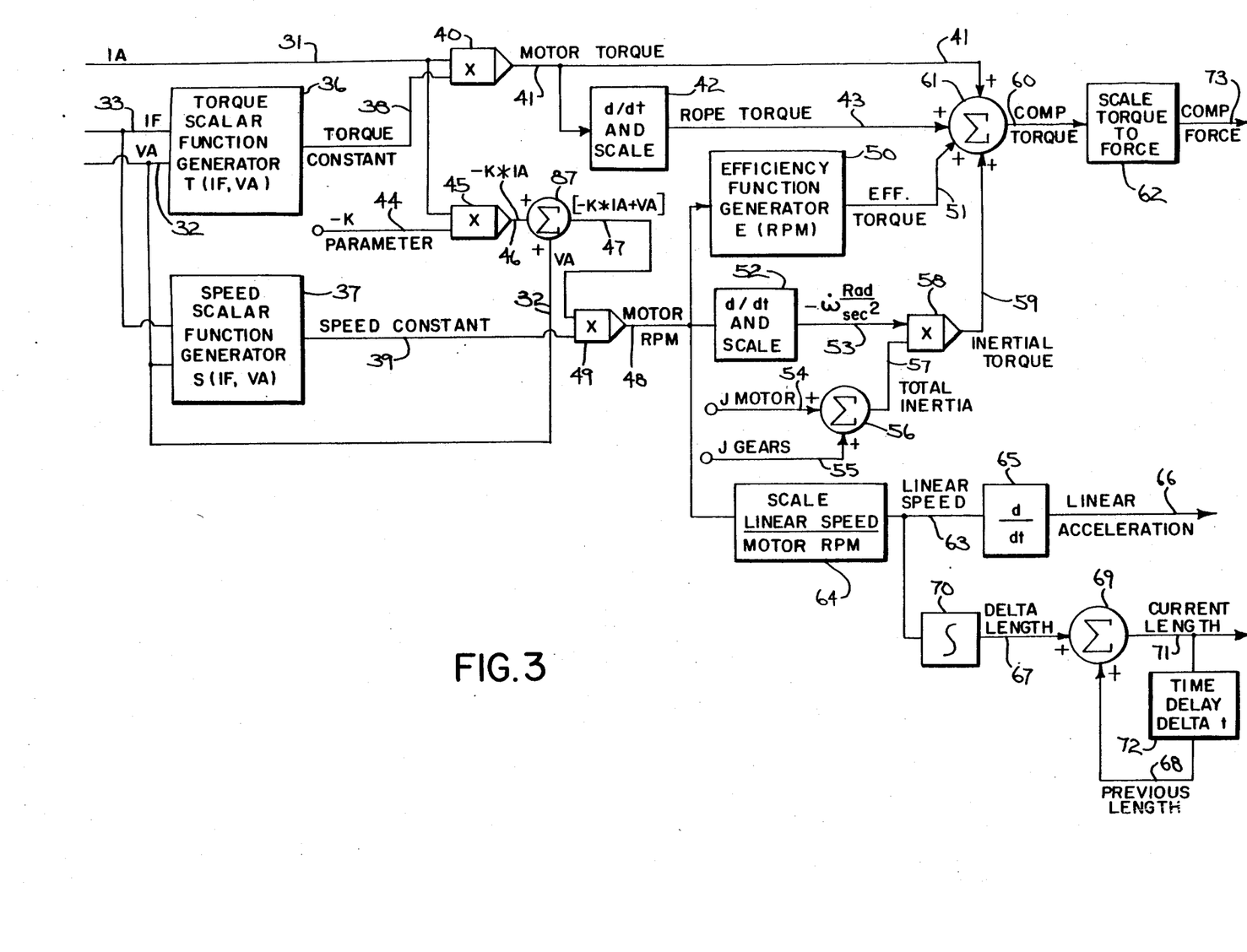
FIG. 3 is a functional block diagram of the hoist and crowd modeling functions used in the block diagram of FIG. 2.

Referring to FIG. 3, two scalar function generators 36 and 37 are used to determine a torque constant 38 and speed constant 39 respectively. It is well known in the art that such constants 38 and 39 can be determined based on the field current IF 33 and armature voltage VA 32 by using graphical methods on the design curves published for a given motor. To allow the torque and speed constants 38 and 39 to be rapidly determined by a single formula, the scalar function generators 36 and 37 implement a fifth order polynomial to perform the calculation. The coefficients of the polynomial are determined by performing a least-squares curve fit to the graphical motor design curves for the applicable motor. The general form of the equation used in the torque scalar function generator 36 is:

$$T(IF, VA) = [a_0 IF^4 + a_1 IF^2 + a_3 IF + a_4] \frac{VA}{VA \text{ Rated}} \quad (1)$$

Two different sets of coefficients $a_0$–$a_4$, and a different rated voltage, VA Rated, are used in the hoist and crowd modeling functions 34 and 35 to account for differing motor parameters. Similarly, the general form of the equation used in the speed scalar function generator 37 is:

$$S(IF, VA) + [b_0 IF^4 + b_1 IF^3 + b_2 IF^2 + b_3 IF + b_4] \frac{VA}{VA \text{ Rated}}$$

Again, different sets of coefficients $b_0$–$b_4$ and a different rated voltage, VA Rated, are used in the hoist and crowd modeling functions 34 and 35 to account for differing motor parameters.

The torque constant 38 is multiplied by the armature current IA 31 in a multiplier 40 to yield the motor torque 41 being produced. As the motor torque 41 changes, the steel wire crowd and hoist ropes such as 19 are either stretched or relaxed depending on whether the motor torque 41 is increasing or decreasing respectively. This stretching and relaxation represents a conservative torque affecting the amount of motor torque 41 ultimately delivered to the bucket 20. To compensate for this conservative effect, the motor torque 41 is differentiated and scaled in function block 42 to produce the effective rope torque 43. The actual scaling factor used is determined experimentally based upon the overall shovel mechanics.

A constant parameter $-k$ 44 is also determined from the motor design data in well known fashion. The parameter $-k$ 44 is multiplied by the armature current IA 31 in multiplier 45 to produce the term $-k^*IA$ 46, which is then added to the armature voltage VA 32 in summer 87 to yield the quantity $[-k^*IA+VA]$ 47. As is well known in the art, the motor RPM 48 is determined by multiplying the speed constant 39 by the quantity $[-k^*IA+VA]$ 47 in multiplier 49. The motor RPM 48 is then applied to an Efficiency Function Generator 50. The Efficiency Function Generator 50 calculates an efficiency torque 51 which takes into account the cumulative non-conservative losses such as friction, gear loss, and motor inefficiency throughout the system. The actual formula used is a linear function of the motor RPM of the form:

$$ti\ E(RPM) = Keff^*RPM \tag{3}$$

where Keff is a constant determined experimentally to represent the net efficiency torque loss. While the efficiency equation (3) is a simple model of the many complex loss mechanisms, it has been found to be satisfactory in actual practice.

The motor RPM 48 is differentiated and scaled in function block 52 to produce the angular acceleration quantity $-\dot{\omega}$ 53 expressed in terms of radians/sec$^2$. The inertia of the motor itself, $J_{motor}$ 54 and the inertia of all other rotating gears and shafts, $J_{gears}$ 55 are added in summer 56 to produce the total inertia 57. Then in multiplier 58 the angular acceleration quantity $-\dot{\omega}$ 53 is multiplied by the total inertia 57 to yield the inertial torque 59 which represents the torque required to overcome the fixed inertia in the system and therefore not available to be delivered to the bucket 20. The inertial torque 59 is a conservative effect and therefore can have a positive or negative sign.

The net total compensated torque 60 is then calculated in summer 61 by adding together the motor torque 41, the conservative effect of rope torque 43, the non-conservative loss effect of efficiency torque 51, and the conservative effect of inertial torque 59.

The compensated torque 60 is scaled to units of a linear compensated force 73 in function block 62 using the known gear ratios and moment arms of the respective hoist and crowd cable drums (not shown). Different scaling factors are used for the crowd arm 21 and hoist rope 19 torque to force conversion.

The motor RPM 48 is also converted to a linear speed 63 in function block 64 using the appropriate scaling factors for the crowd arm 21 and hoist rope 19. The resulting linear speed 63 is then differentiated in function block 65 by subtracting the previous value (not shown) of linear speed 63 and dividing that quantity by delta t, the time interval since the previous value was taken. The result of the differentiation is the linear acceleration 66 of the respective member (crown arm 21 or hoist rope 19).

The linear speed 63 is also integrated in function block 70 by multiplying the linear speed 63 by the same delta t as described above, and the resultant length increment, delta length 67, is added to the previous length 68 in summer 69 to yield an updated current length 71. The current length is also delayed by delta t in function block 72 to become the previous length 68 to be used in the next calculation. The current length 71 then is a running accumulation of either the length of the crown arm 21 or hoist rope 19 extended.

Referring back to FIG. 2, the modeling functions 34 and 35 thus described above for the hoist rope 19 and crowd 21 provide accurate measurements of compensated forces 74 and 75, linear accelerations 76 and 77, and current lengths 78 and 79 respectively.

Referring to FIGS. 1 and 2, the hoist rope current length 78 and crowd current length 79 are operated on by the shovel geometry function block 94 to compute the relevant angles. The chord of the main boom 13 through the crowd pivot point 22 and the center of the hoist pulley 17 shown by dashed line 80 has a length l 81 between the crowd pivot point 22 and the hoist rope chord 88, and forms a known angle $\theta$ 82 with horizontal 83. A calibration procedure is performed at the beginning of each shift in which the crowd arm 21 is extended until it is fully extended, and then raised until it is approximately horizontal. From this calibrated position, the crowd current length 79 and the hoist rope current length 78 are initialized to their respective known dimensions as determined from the shovel mechanical drawings. From then on, the modeling functions 34 and 35 for the hoist rope 19 and crowd 21 respectively, continually update the current lengths 78 and 79 as described above. Based upon the known fixed length l 81, the computed crowd current length 79, and the computed hoist rope current length 78, the law of Sines is applied to determine the interior angles A 84, B 85, and C 86 of the triangle formed by the main boom chord 80, the hoist rope chord 88 and the crowd arm chord 89. Then, using the known fixed angle $\theta$ 82 and the angles A 84, B 85, and C 86, the angle $\alpha$ 92 between the crowd chord 89 and horizontal 83 and the angle $\beta$ 93 between the hoist rope chord 88 and vertical 91 are computed using well known geometrical relations. The sine 110 of the angle $\alpha$ 92 and the cosine 103 of the angle $\beta$ are also computed in the shovel geometry function block 94.

The shovel geometry function block 94 also computes the hardware weight 95 of the shovel hardware acting on the bucket 20 so that it can be later subtracted from the total weight 96 to arrive at the net weight 97 of the material in the bucket 20. The hardware weight 95 is computed by summing:

(A) the hoist rope weight based on the hoist rope current length 78 and the weight per unit length 98 of the hoist rope 19, (B) the moment of the crowd arm 21 acting on the bucket 20 based on the length of the crowd current length 79, the total crowd arm length 100, and the weight per unit length 101 of the crowd arm 21, and (C) the empty weight of the bucket 102.

Referring again to FIG. 2, the cosine $\beta$ term 103 thus computed is multiplied by the compensated hoist force 74 and the hoist linear acceleration 76 in multipliers 104 and 105 to yield the vertical components 108 and 109 of the hoist force 108 and hoist acceleration 109 respectively. Similarly, the Sine $\alpha$ term 110 is multiplied by the compensated crowd force 75 in multiplier 111 to yield the vertical component 112 of the crowd force. In crowd vertical acceleration function block 113, to calculate the vertical contribution 115 of the crowd linear acceleration 77 to the total vertical acceleration 117 it is first necessary to calculate the projection of the crowd linear acceleration 77 that is orthogonal to the hoist rope angle $\beta$ 93. This is accomplished by multiplying the crowd linear acceleration 77 by $\cos(\alpha-\beta)$ since $\alpha$ 92 and $\beta$ 93 are referenced to horizontal 83 and vertical 91 respectively. Then, the projection of that orthogonal component on the vertical 91 is obtained by multiplying by sin ($\beta$). So, the net vertical contribution computed in function block 113 is:

$$\begin{array}{c} \text{Net crowd} \\ \text{Vertical} \\ \text{Contribution} \end{array} = \sin(\beta) * \cos(\alpha - \beta) * \begin{vmatrix} \text{Crowd} \\ \text{linear} \\ \text{acceleration} \end{vmatrix} \qquad (4)$$

The vertical components 108 and 112 of hoist force 108 and crowd force 112 are added in summer 114 to produce the total vertical force 115. Likewise, the vertical component 109 of hoist linear acceleration 76 and the vertical contribution 115 of crowd linear acceleration 77 are added in summer 116 to produce the total vertical acceleration 117, expressed in terms of gravitational units (g's). The total weight 96 acting on the bucket 20 is then obtained by dividing the total vertical force 115 by the total vertical acceleration 117 in divider 107. The total weight 96 thus computed in the SLM system of the present invention is obtained by the dynamic calculation of dividing a force by an acceleration instead of simply using the total vertical force as the apparent weight as is the prevailing practice in prior systems. The SLM system is therefore able to achieve accuracies and repeatabilities heretofore unobtainable.

Finally, the hardware weight 95 computed in the shovel geometry function block 94 as described above is subtracted from the total weight 96 in summer 118 to yield the net weight 97 of material in the bucket 20.

Still referring to FIG. 2, a mode detect function block 119 serves to detect the operating mode of the shovel. A voltage sensor 30 senses the swing motor armature voltage VAS 32c which is scaled in function block 120 in well known fashion to yield a value for the approximate swing speed 121. This approximation has been found to be acceptable in practice for the mode detect functions. The inputs to the mode detect function 119 include the compensated hoist force 74, the hoist rope current length 76, the approximate swing speed 121, a dipper trip logic input 122 indicating that a dipper trip has occurred, and the time of day 123 from an internal clock (not shown).

Figure 4:
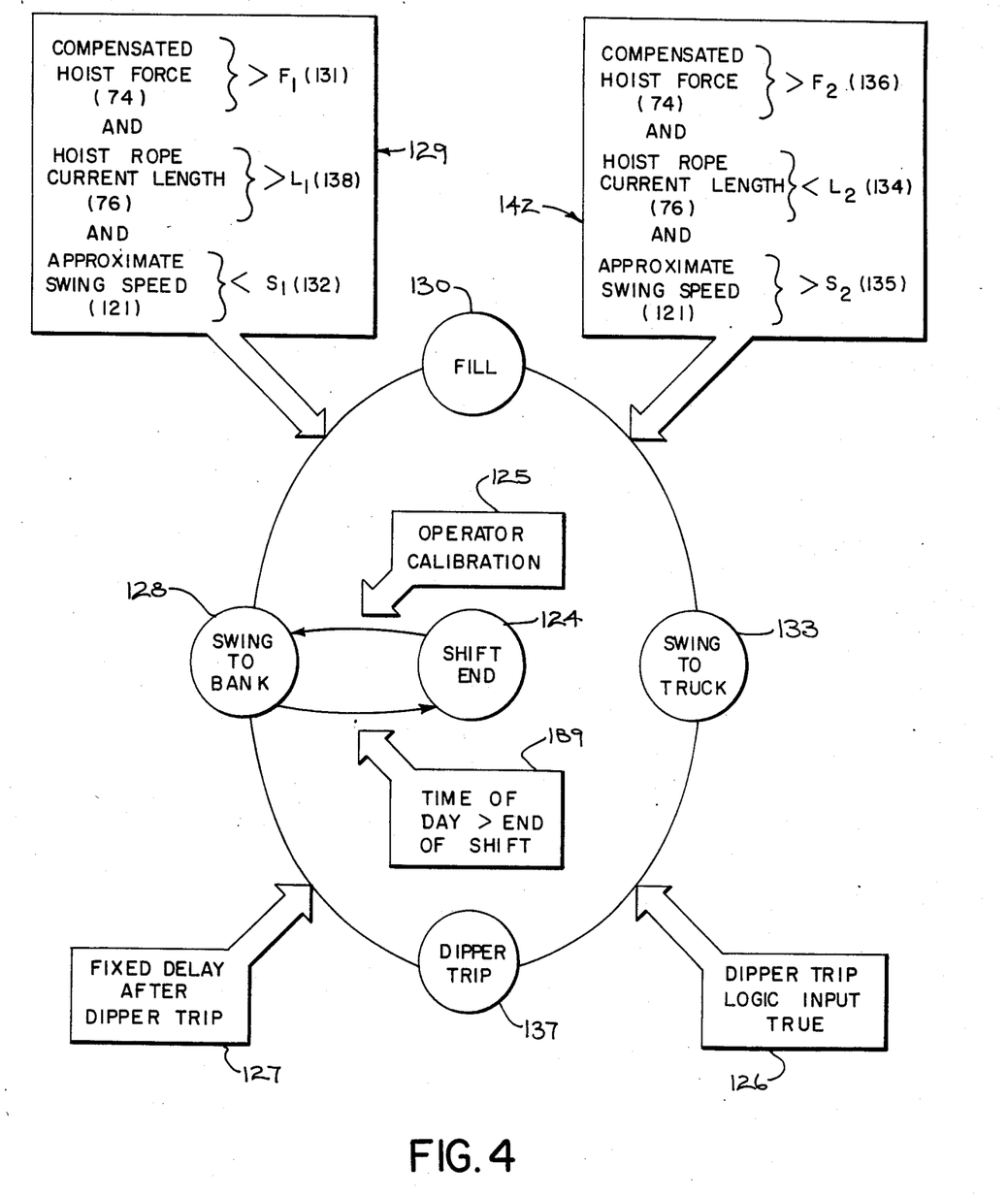
FIG. 4 is a mode transition block diagram of the load measurement system of FIG. 1.

Referring to FIGS. 2 and 4 to describe the mode detect function 119, shovel operation begins in the shift end mode 124. The criteria in criteria block 125 for changing mode from the shift end mode 124 to the swing to bank mode 128 is the completion of operator calibration as described above. The criteria in criteria block 129 for changing mode from the swing to bank mode 128 to the Fill mode 130 requires that the compensated hoist force 74 be greater than a predetermined minimum force $F_1$ 131, and that the hoist rope current length 76 be greater than a predetermined minimum length $L_1$ 138, and that the approximate swing speed 121 be less than a predetermined maximum speed $S_1$ 132. These criteria are chosen to typify the operation of the shovel 10 while filling where the machinery house 11 would not be swinging, there would be a lot of hoist rope 19 out, and the compensated hoist force 74 would be large due to friction with the bank (not shown). The values of the actual parameters $F_1$ 131, $L_1$ 138, and $S_1$ 132 are determined experimentally to encompass normal filling profiles for a particular shovel.

The criteria in criteria block 142 for changing mode from fill mode 130 to the swing to truck mode 133 requires that the compensated hoist force 74 be greater than a predetermined minimum force $F_2$ 136, and that the hoist rope current length 76 be less than a predetermined maximum length $L_2$ 134 and that approximate swing speed 121 be greater than a predetermined minimum speed $S_2$ 135. These criteria are chosen to typify the operation of the shovel 10 while swinging to the truck where the bucket 20 would be heavy with material, the hoist rope current length 76 would be relatively short, and the machinery house 11 would be swinging. The values of the actual parameters $F_2$ 136, $L_2$ 134, and $S_2$ 135 are determined experimentally to encompass normal swing to truck profiles for a particular shovel. It is during the swing to truck mode 133 that the net weight 97 of material in the bucket 20 is calculated because it is then that the load is fully suspended from the shovel 10 and away from the bank (not shown). The shovel then remains in the swing to truck mode 133 until the dipper trip logic input 122 in criteria block 126 becomes true indicating that the operator has dumped the contents of the bucket 20 into the truck (not shown). When the dipper trip logic input 122 becomes true, the shovel mode changes from the swing to truck mode 133 to the dipper trip mode 137. In the dipper trip mode 137, the net weight 97 of the contents of the bucket 20 is added to a running total of weight already dumped into the truck. As will be described in more detail below, the running total of the material weight in the truck is displayed to the operator and is reset to zero when the operator dispatches the truck. The criteria in criteria block 127 for changing mode from the dipper trip mode 137 to the swing to bank mode 128 is a fixed delay after the dipper trip has occurred. During the fixed delay, the processing associated with the dipper trip mode 137 is performed as will be described in detail below and as soon as that processing is complete, the mode advances automatically to the swing to bank mode 128. Back in the swing to bank mode, if the operator upon inspecting the display of the running total truck weight decides that the truck is full, a command is entered to dispatch the truck and the running total truck weight is reset to zero. Otherwise, the mode continues to advance in cyclical fashion from swing to bank mode 128, to fill mode 130, to swing to truck mode 133, to dipper trip mode 137, and back to swing to bank mode 128 until the shift is over as determined by the criteria in criteria block 189 signifying that the time of day is past the end of the shift. Then the mode changes from swing to bank mode 128 to the shift end mode 124 and remains there until the next shift begins.

Figure 5:
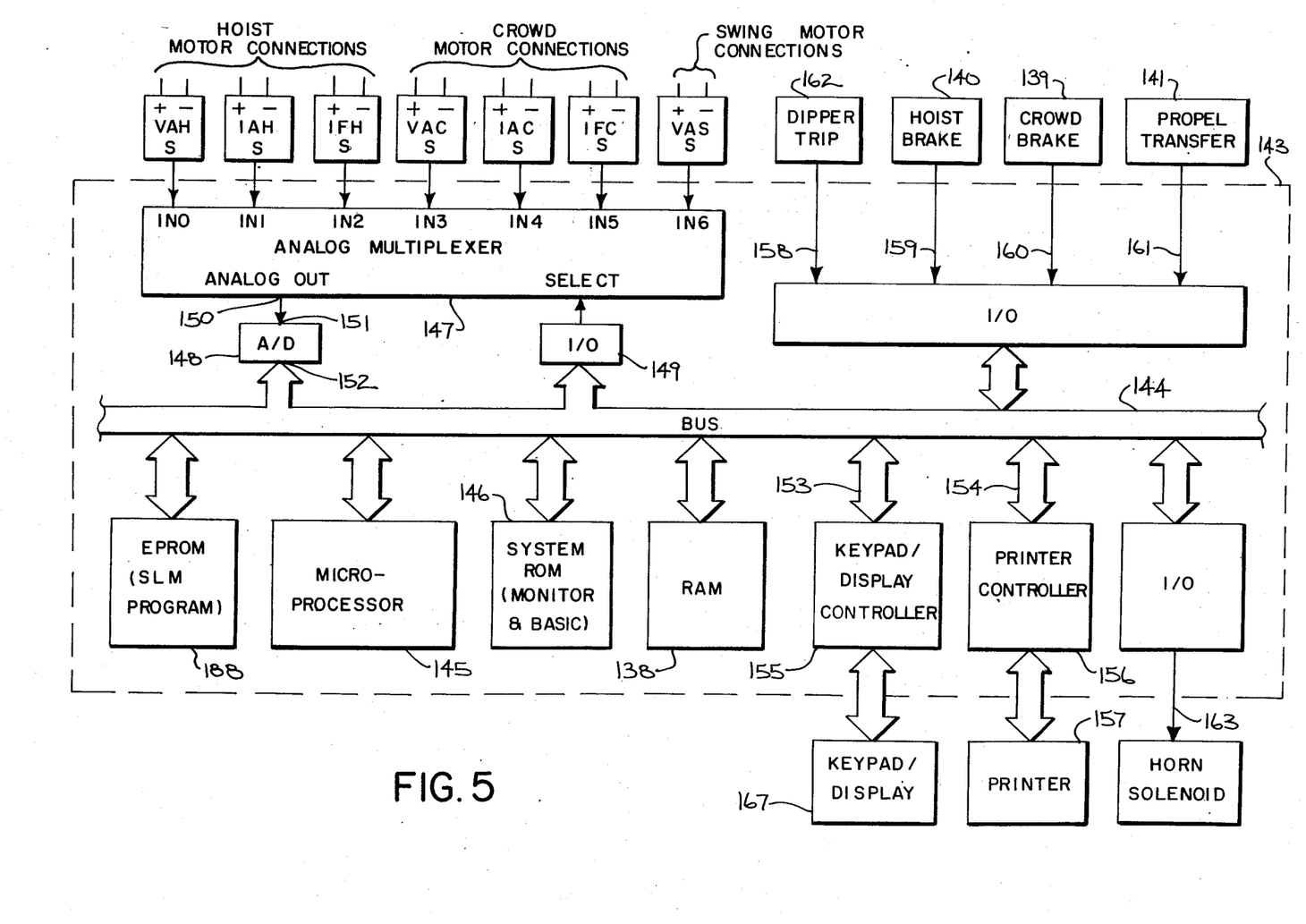
FIG. 5 is a block diagram of the electrical hardware used in the load measurement system of FIG. 1.

Referring to FIGS. 4 and 5, a delay mode (not shown) is also provided. The delay mode (not shown) is entered from any other mode whenever any of the logic inputs for crowd brake 139, hoist brake 140, or propel transfer 141 become true. The delay mode (not shown) is simply a waiting state and remains in effect until all of the related inputs 139, 140, and 141 are again false, in which case the mode reverts to the mode that was active at the time the delay began.

Referring to FIG. 5, the load measurement system of the present invention is implemented on a microprocessor based digital processing system of well known design. The particular system used employs a commercially available Single Board Computer (SBC) shown in dashed line 143, model MicroMac 5000 manufactured by Analog Devices. On the SBC 143, a central bus 144 is used for communications among the various components. A microprocessor 145, specifically a type 8087 manufactured by Intel Corp. serves as the main processing element. A system Read Only Memory (ROM) 146 contains software for a system monitor and an interpreter for the programming language BASIC. A Random Access Memory (RAM) 138 is included to provide read/write storage. The program which implements the load measurement functions of the present invention in this embodiment is written in BASIC and stored in an Erasable/Programmable Read Only Memory (EPROM) 188. The SBC 143 also contains an analog multiplexer 147, an analog to digitial (A/D) converter 148 and an input/output (I/O) 149 to select the channel on the analog multiplexer 147. The inputs of the analog multiplexer are connected to the current and voltage sensors 29 and 30 on the Hoist, Crowd, and Swing motors 23, 24, and 25. The output 150 of the analog multiplexer 147 is the selected channel and is connected to the input 151 of the A/D converter 148. The A/D output 152 is interfaced to the bus 144 thereby making the digitized values available to the microprocessor 145.

Interfaces 153 and 154 are also included on the SBC 143 for a Keypad/Display controller 155 and a printer controller 156 respectively. A Keypad/Display 167 is connected to the Keypad/Display controller 155 and serves to display the running truck weight to the operator and to allow the operator to input commands, such as for calibration complete and truck dispatch. A printer 157 is connected to the printer controller 156 and serves to print the end of shift report.

Logic inputs 158, 159, 160, and 161 are provided on the SBC 143 for Dipper Trip 162, Hoist Brake 140, Crowd Brake 139, and Propel Transfer 141. A logic output 163 is also provided to energize a horn solenoid to signal the truck to leave.

Figure 6:
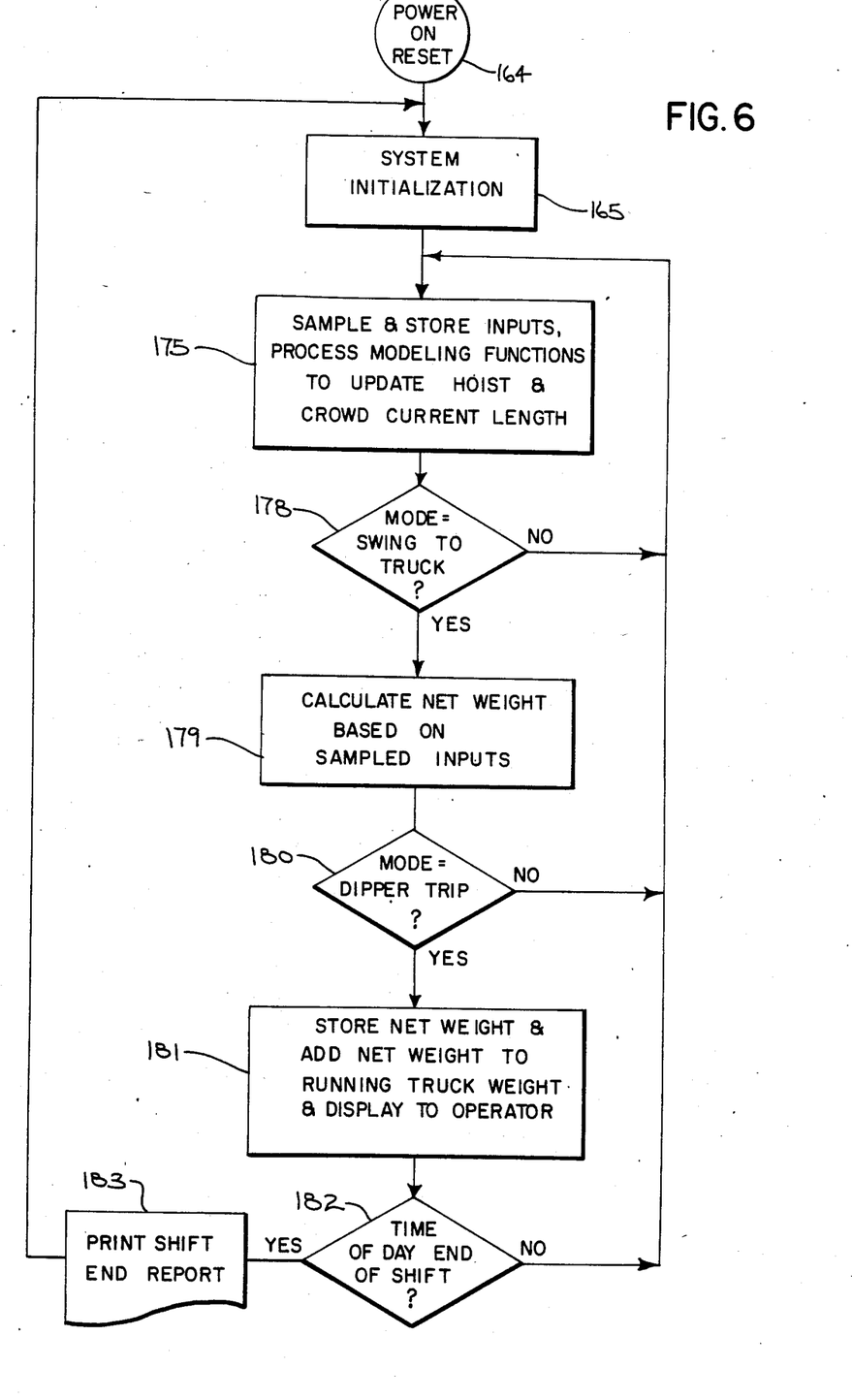
FIG. 6 is a flow chart of the software main procedure used on the load measurement system of FIG. 1.

Referring to FIG. 6, the processing for the load measurement system of the present invention begins in reset block 164 which is entered either automatically when power is applied to the SBC 143 or if the operator activates a reset command from the Keypad/Display 167. The system initialization in block 165 sets up the system for operation and performs the calibration procedure for the crowd 21 and hoist rope 19 as described above.

Figures 7, 8:
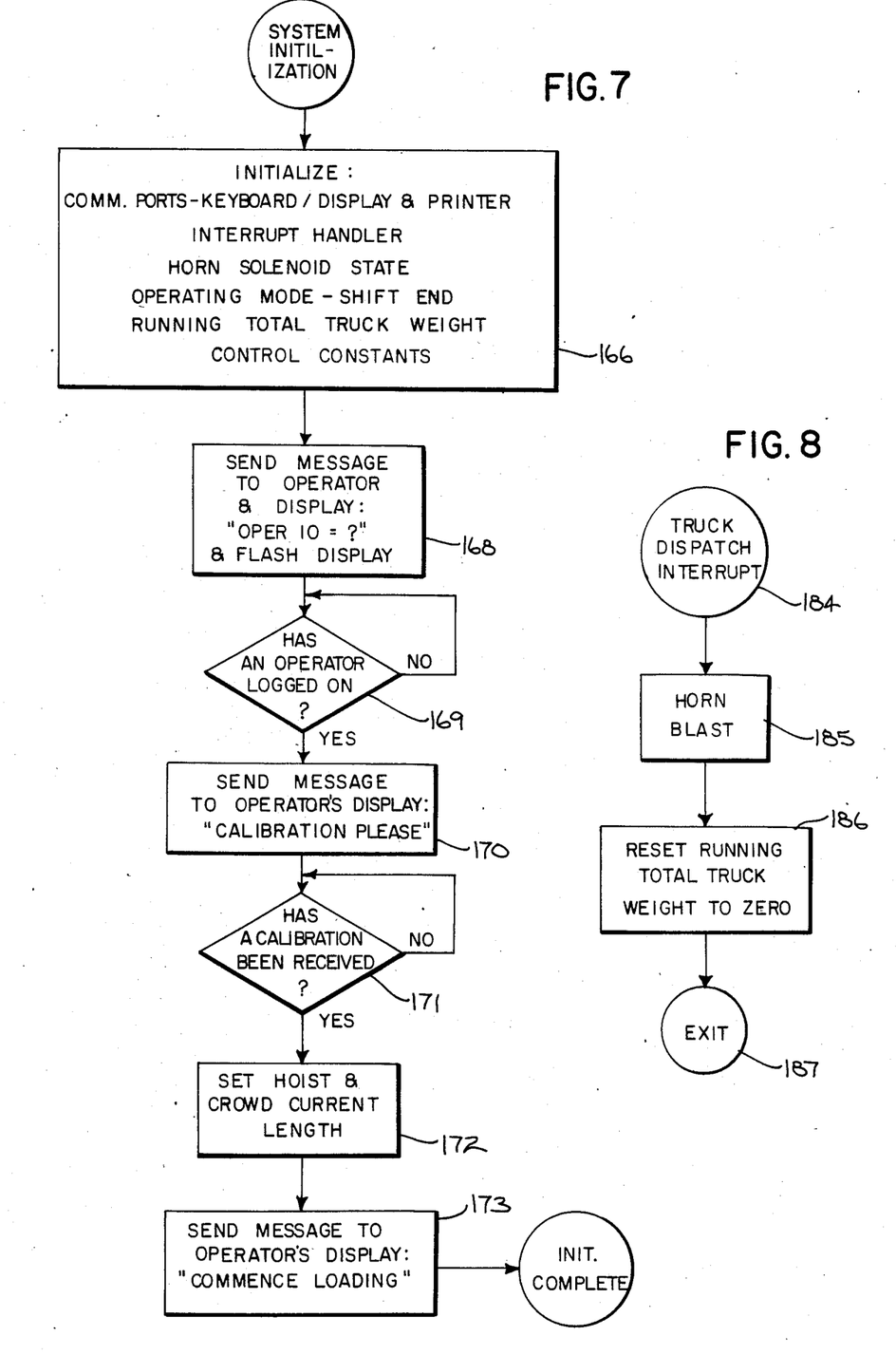
FIG. 7 is a flow chart of the system initialization software routine used in the main procedure of FIG. 6.
FIG. 8 is a flow chart of a software interrupt procedure for truck dispatching used on the load measurement system of FIG. 1.

Referring to FIG. 7, the system initialization includes a set up block 166 which performs initialization for:
A. The Communication ports for the Keypad/Display 167 and Printer 157,
B. The interrupt handler,
C. The horn solenoid state,
D. The operating mode (set to shift end mode 124),
E. The Input Channels,
F. The running total truck weight, and
G. The control constants.

Then, a message is sent in block 168 to the operator requesting an operator identification (ID) to be entered. In block 169 a wait is performed until the ID has been entered on the Keyboard/Display 167. Then, a message is sent in block 170 requesting the operator to place the bucket 20 in the calibrated position as described above. In block 171 a wait is performed until the operator enters a command from the Keyboard/Display 167 signifying that the calibration is complete. Then in block 172, the hoist rope current length 78 and crowd current length 79 are set to the values corresponding to the calibrated position as described above. Finally in block 173, a message is sent to the operator to commence loading, and the mode is set to swing to bank 128.

Referring back to FIG. 6, upon completion of the system initialization, in block 175 all inputs are sampled and stored, and the hoist and crowd modeling functions 34 and 35 as described above are performed thereby keeping the hoist and crowd lengths 78 and 79 continually updated. A test is then made in block 178 to check if the mode is swing to truck 133. If not, execution reverts to block 175. If the mode is in swing to truck 133, additional processing is performed in block 179 where the net weight 97 is calculated based on the most recently stored input values according to the functional description above. Having calculated the net weight 97, another test is made in block 180 testing for dipper trip mode signifying that the material has been deposited in the truck. If dipper trip has occurred, then, in block 181 the net weight 97 is stored and added to the running total truck weight which is then displayed to the operator. Otherwise, a loop back to block 175 is made. Finally, in block 182 if the shift is not yet over, processing loops back to block 175 to again wait for the swing to truck mode to be entered. When the shift finally is over, a shift end report is printed in block 183 which contains all the data compiled during the shift. This data is continually gathered throughout the shift although not explicitly detailed above and contains information such as the number of loading cycles, the total weight of material loaded, a truck fill time histogram, a shovel cycle time histogram, and the like. After the shift end report is printed, control is again transferred to the system initialization in block 165 for the start of the next shift.

Referring to FIG. 8, an interrupt procedure provides for dispatching a truck when the operator ascertains that it is full by inspection of the running total truck weight displayed. When the operator decides to dispatch the truck a command is entered from the Keypad/Display 167 and the interrupt procedure is entered in block 184. In block 185 the horn solenoid 163 is energized for a predetermined time to signal the driver to leave. Then, in block 186 the running total truck weight is reset to zero in preparation for the next truck. Finally, an exit is performed in block 187.

The load measurement system of this invention has been described in conjunction with a mining shovel. It should be apparent to one skilled in the art that the load measurement system of this invention could be adapted to other loading equipment, for example a dragline. In this case the determinations made in conjunction with the crowd motor would be made instead for the dragline motor. Similarly, the load measurement system can be advantageously employed in connection with a crane wherein the indicated crowd motor determinations would instead be made in conjunction with the motor which raises and lowers the boom, or simply applied in a single dimension as in for example an overhead crane.

While in the foregoing description a swing motor and mode detect system has been described in combination with determinations of the hoist and crowd motors, this is not essential as accurate load determinations can be made without this feature. The load measurement system of this invention is also operable where some of the previously described determinations are not employed. For example, instead of deriving speed and position from motor operating parameters, encoders and/or tachometers could be used. Similarly, hoist rope and crowd angles $\beta$ 93 and $\alpha$ 92 respectively could be measured directly with angular position sensors. However, these approaches require additional hardware not needed in the foregoing preferred embodiment.

I claim:
1. A suspended load measurement system for determining the load weight moved by large mining and hoisting machinery such as excavators and cranes, the machinery having electric drive motors, mechanical drive means and cables attached to a load support for moving the load weight, the suspended load measurement system comprising:

sensing means to determine the position of said load support;

means responsive to said sensing means to determine the vertical component of the linear acceleration of said load support; and means responsive to said sensing means to determine the vertical component of the force required to effect movement of said load support; and means to determine the net load weight by performing a dynamic calculation compensating said vertical component of the force for said vertical component of the acceleration.

2. The system of claim 1 wherein said means to determine the vertical component of the linear acceleration of said load support includes means to determine the speed of the electric drive motors and the cable acceleration.

3. The system of claim 1 wherein said means to determine the vertical component of the force required to effect movcement includes means to determine the torques and speeds of the electric drive motors.

4. The system of claim 2 wherein said large industrial machinery is a power shovel and said electric drive motors power hoist and crowd functions.

5. The system of claim 3 wherein said large industrial machinery is a power shovel and said electric drive motors power hoist and crowd functions.

6. The system of claim 1 wherein said means to determine said vertical components of the linear acceleration and force include means to correct for conservative losses of rotational inertia of the motors, reduction gear train, stretch of the cables and bucket inertia.

7. The system of claim 6 wherein said means to determine said vertical components of the linear acceleration and force include means to correct for non-conservative losses due to friction, gear loss and motor inefficiency.

8. The system of claim 7 further including means to determine the weight of the machinery cables and bucket.

9. The system of claim 1 including means to determine the operating mode of the machinery.

10. In a suspended load measurement system for mining or large hoisting machinery comprising a load support and operating systems to move the load support vertically and laterally, the operating systems including electric drive motors, mechanical drive means and cables attached to the load support, the load measurement system comprising:

dynamic model means to provide compensated forces and linear accelerations of the mechanical drive means;

means to continuously locate the load support; and means to continuously determine the drive motor operating parameters including the current and voltage of the drive motors.

11. The system of claim 10 wherein said dynamic model means includes means to ascertain conservative and nonconservative losses of each said drive motor.

12. The system of claim 11 wherein said conservative and nonconservative losses include inertia, mechanical losses and cable stretch.

* * * * *